(12) United States Patent
Schubert et al.

(10) Patent No.: US 12,183,925 B2
(45) Date of Patent: Dec. 31, 2024

(54) REDOX FLOW BATTERY FOR STORING ELECTRICAL ENERGY IN UNDERGROUND STORAGE MEANS, AND USE THEREOF

(71) Applicant: Friedrich-Schiller-Universitaet Jena, Jena (DE)

(72) Inventors: Ulrich Sigmar Schubert, Jena (DE); Martin Hager, Dornburg-Camburg (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 432 days.

(21) Appl. No.: 17/297,777

(22) PCT Filed: Nov. 27, 2019

(86) PCT No.: PCT/EP2019/000324
§ 371 (c)(1),
(2) Date: May 27, 2021

(87) PCT Pub. No.: WO2020/108788
PCT Pub. Date: Jun. 4, 2020

(65) Prior Publication Data
US 2022/0020990 A1 Jan. 20, 2022

(30) Foreign Application Priority Data
Nov. 29, 2018 (DE) ..................... 10 2018 009 363.9

(51) Int. Cl.
*H01M 4/36* (2006.01)
*H01M 4/60* (2006.01)
*H01M 8/18* (2006.01)

(52) U.S. Cl.
CPC ............. *H01M 4/60* (2013.01); *H01M 4/368* (2013.01); *H01M 8/188* (2013.01)

(58) Field of Classification Search
CPC .......... H01M 4/60; H01M 4/368; H01M 8/188
See application file for complete search history.

(56) References Cited

U.S. PATENT DOCUMENTS

| 11,088,374 B2 | 8/2021 | Neuhaus |
| 2012/0077067 A1* | 3/2012 | Li ........................ H01M 8/184 429/107 |

(Continued)

FOREIGN PATENT DOCUMENTS

| DE | 102015010083 A1 | 2/2017 |
| DE | 102016212390 | * 1/2018 |

(Continued)

OTHER PUBLICATIONS

Angew Chem Int Ed—2016—Janoschka—An Aqueous Redox-Flow Battery with High Capacity Angew. Chem. Int. Ed. 2016, 55, 14427-14430 (Year: 2016).*

(Continued)

*Primary Examiner* — Alexander Usyatinsky
(74) *Attorney, Agent, or Firm* — Abel Schilliner, LLP (57) ABSTRACT

A redox flow battery for storing electrical energy is described, comprising a reaction cell with two electrode chambers for catholyte and anolyte, each of which is connected to at least one liquid reservoir, the electrode chambers being separated by a membrane, being equipped with electrodes, and each being filled with electrolyte solutions which contain redox-active components dissolved or dispersed in an aqueous electrolyte solvent, as well as conducting salts dissolved therein and possibly further additives. A second embodiment relates to a redox flow battery for storing electrical energy, comprising a reaction cell with an electrode chamber for an electrolyte solution, which is connected to at least one liquid reservoir, the electrode chamber being equipped with a cathode and an anode, and being filled with electrolyte solution which contains redox-active com- (Continued)

ponents dissolved or dispersed in an aqueous electrolyte solvent, as well as conductive salts dissolved therein and possibly further additives. The redox flow cells are characterized in that the at least one liquid reservois is an underground storage means in which temperatures of at least 30° C. prevail, in that the concentration of the salts dissolved in the electrolyte solutions is at least 10% by weight, and in that the catholyte or the electrolyte solution contains selected redox-active and temperature-stable components. In the first embodiment, the anolyte contains a water-soluble redox-active component and in the second embodiment, the anolyte or the electrolyte solution contains a zinc salt.

17 Claims, 2 Drawing Sheets

(56) References Cited

U.S. PATENT DOCUMENTS

| | | | |
|---|---|---|---|
| 2014/0141291 A1* | 5/2014 | Wang | H01M 4/405 429/105 |
| 2016/0208030 A1* | 7/2016 | Gavvalapalli | H01M 8/20 |
| 2016/0344056 A1* | 11/2016 | Kniajanski | C25D 17/10 |
| 2018/0072669 A1* | 3/2018 | Liu | H01M 8/188 |
| 2018/0241065 A1* | 8/2018 | Schubert | H01M 8/188 |
| 2018/0331363 A1 | 11/2018 | Winsberg | |
| 2019/0229350 A1* | 7/2019 | Neuhaus | H01M 8/188 |

FOREIGN PATENT DOCUMENTS

| | | |
|---|---|---|
| WO | 2014026728 A1 | 2/2014 |
| WO | 2017025177 A1 | 2/2017 |
| WO | 2017084749 A1 | 5/2017 |
| WO | 2018007598 A1 | 1/2018 |
| WO | 2018032003 A1 | 2/2018 |
| WO | 2018114012 A1 | 6/2018 |

OTHER PUBLICATIONS

Feng Pan and Quing Wang "Redox Species of Redox Flow Batteries: A Review in Molecules" 2015, 20, 20499-20517.
Winsberg et al. in Angew. Chem. 2017, 56, 686-711.
A. Salmom "Synthase und Elektrochemie funktioneller Ferrocenyl- und Multiferrocenyi-Verbindungen", Bielefeld (2001).
M.-A. 10 Goulet, M. J. Aziz, J. Electrochem-. Soc 2018, 165, A1466-A1477.

* cited by examiner

REDOX FLOW BATTERY FOR STORING ELECTRICAL ENERGY IN UNDERGROUND STORAGE MEANS, AND USE THEREOF

The invention relates to a redox flow battery, also known as a redox flux battery (hereinafter also referred to as "RFB"), which uses underground storage means as storage tank(s). Such systems are used to store electrical energy based on electrochemical redox reactions.

An RFB typically consists of a galvanic cell, which is built up of two polarity-specific chambers (half cells). These are usually separated by a membrane. In addition, two or more storage tanks are necessary, in which electrolytes containing the redox active materials are present.

In addition to classical RFB, hybrid RFB (hereinafter also referred to as "RFB" or "hybrid RFB") are known in which at least one redox pair consists of a combination of solid and a salt, e.g. as redox pair $Zn^{2+}/Zn^0$. Such systems are described in WO 2017/084749 A1. During the charging or discharging process, (non-redox active) ions in the electrolyte enable a charge exchange across the membrane. This keeps the redox active substances in the respective half cell. In contrast to RFB, the membrane can also be omitted in hybrid RFB. In addition, hybrid RFB can also be designed to require only a single storage tank.

Due to their excellent scalability, RFBs are particularly suitable as stationary energy storage systems for various performance and capacity requirements. For example, as buffer systems for renewable energies, both in the private (e.g. single- or multi-family homes), as well as industrial sector (e.g. wind and solar power plants). They thus have great potential for ensuring power grid stability and for decentralized energy supply.

Existing RFB are electrochemical energy storage devices. The substances required to set the potential at the electrodes are redox-active species, either dissolved or in particle form, which are converted to their respective other redox stage during the charging or discharging process in an electrochemical reactor. For this purpose, electrolyte solutions (catholyte, anolyte) are taken from a tank and actively pumped to the electrodes. The anode and cathode compartments are separated in the reactor by a semi-permeable membrane, which usually exhibits high selectivity for protons and/or which is a size exclusion membrane. As long as electrolyte solution is pumped, current can be drawn. The charging process is then simply the reverse of the process. Thus, the amount of energy that can be stored in an RFB is directly proportional to the size of the storage tanks. The extractable power, on the other hand, is a function of the size of the electrochemical reactor. The same applies to hybrid RFB, where the need for multiple tanks or the presence of a membrane can be eliminated.

RFB have a complex system technology that corresponds roughly to that of a fuel cell. Typical sizes of the individual reactors range from about 2 to 50 kW. The reactors can be combined very easily in a modular fashion, and the tank size can also be adapted almost arbitrarily.

A wide variety of redox-active chemical compounds have already been proposed for use in rechargeable batteries or batteries such as RFB. An overview of the state of the art can be found, for example, in an article by Feng Pan and Quing Wang, "Redox Species of Redox Flow Batteries: A Review" in Molecules 2015, 20, 20499-20517 or in an article by Winsberg et al. in Angew. Chem. 2017, 56, 686-711. According to this RFB containing 2,2,6,6-tetrasubstituted 1-piperidinyloxy compounds as catholyte are already known. Such RFB are also described, for example, in WO 2014/026728 A1, WO 2017/084749 A1 and WO 2017/025177 A1.

Other RFB containing 2,2,6,6-tetrasubstituted 1-piperidinyloxy compounds in the electrolyte are disclosed in WO 2018/032003 A1 and US 2018/0072669 A1.

Ferrocene, bis($\eta^5$-cyclopentadienyl)iron(II), [Fe($\eta^5$-$C_5H_5$)$_2$] has already been used in RFB. For use in aqueous electrolytes, ferrocene must be functionalized by the incorporation of polar groups. An overview of the many possibilities for functionalization of ferrocene is given in the dissertation by A. Salmon entitled "Synthesis and electrochemistry of functional ferrocenyl and multiferrocenyl compounds", Bielefeld (2001). RFB containing functionalized ferrocenes in the electrolyte are also known from WO 2018/032003 A1 and from US 2018/0072669 A1.

So far, RFB have mainly been used at room temperature in the literature. In the scientific literature, there is little evidence of studies at elevated temperatures, e.g. from 30 to 50° C., and no systematic studies on the behavior of aqueous electrolytes containing 2,2,6,6-tetrasubstituted 1-piperidinyl compounds or functionalised ferrocenes at elevated temperatures. Commercial vanadium RFBs (hereinafter also referred to as "V-RFBs") are known to cause problems at temperatures above 40° C. because the electrolytes irreversibly precipitate.

Therefore, V-RFBs are limited in their application temperature or complex cooling is required. Special applications, e.g. for use in cavern storage facilities, where intrinsically elevated temperatures usually occur, are thus denied to V-RFB. Special HCl-containing electrolytes have been developed for V-RFB, which are more temperature-stable and thus allow temperatures of about 45° C. and in some cases of up to 60° C. (cf. US 2012/0077067 A1). However, these electrolytes are extremely corrosive. Other RFB systems have not yet been described at these comparatively high temperatures.

In particular, RFB containing organic redox-active compounds have not yet been used at these high temperatures. This is complicated by the fact that many electrolytes containing organic redox-active compounds are not stable at elevated temperatures, especially in charged state. In this context, it should also be noted that the stability of many organic redox-active materials even at room temperature has been misjudged so far (M.-A. Goulet, M. J. Aziz J. Electrochem. Soc. 2018, 165, A1466-A1477). Simple charge/discharge tests performed so far do not provide any information about an aging behavior of the electrolytes. Thus, the RFB containing TEMPTMA, described as the most stable so far, is also affected by these decomposition processes. At elevated temperatures, the side reactions are further accelerated and lead to a rapid loss of RFB capacity.

Studies have shown that many electrolytes based on redox-active organic compounds decompose faster than previously thought.

Selected redox-active materials have now been found that surprisingly exhibit high stability at elevated temperatures. These permit the preparation of aqueous electrolyte solutions that are stable at elevated temperatures. In addition, these redox-active compounds permit the preparation of RFB that can be operated at elevated temperatures. Higher temperatures of the electrolyte can occur when operating RFB in elevated temperature environments, for example, when storing electrolyte solutions at elevated temperatures and/or also during the throughput of high power during charge/discharge operations in the electrode compartments.

As is well known, the storage capacity of an RFB is limited by the storage volume of the tanks for storing the electrolytes. As the capacity of an RFB increases, the number of tanks for storing the electrolytes therefore increases in such systems, and with it the complexity of the system technology.

Caverns as battery storage systems are known from WO 2018/007598 A1 and WO 2018/114012 A1. In addition, the brine4power project concerns such systems (www.ewe-gasspeicher.de/home/b4p). Caverns are suitable for the storage of large quantities of electrolyte solutions and allow the production of RFB with large storage capacity.

For RFB with high storage capacity, underground storage means, such as the systems with cavern storage described above, are suitable. Underground storage means offer the possibility of storing large to extraordinarily large quantities of liquid in a simple manner. This allows easy storage of the electrolyte solutions required for RFB operation.

Underground storage means often have elevated temperatures of at least 30° C. and, depending on the depth and the geological conditions, of more than 80° C., so that the liquids stored in them also assume these temperatures during storage. When electrolyte solutions are stored in caverns at greater depths, temperatures of about 50 to 80° C. can be expected, but at least of 30 to 50° C. In addition, the liquids stored in underground storage means often have a high salt content. This can be caused by salts present in the surrounding rock, or the brine produced when caverns in salt domes are flushed out can be used as the fluid to be stored.

So far, mainly classical RFB have been described, which only use solutions with low concentrated salt solutions. These systems—with the exception of the known variants with cavern storage—are not based on highly concentrated or saturated salt solutions ("brine").

It has been found that by using selected redox-active compounds in underground storage means where elevated temperatures prevail, RFBs with high storage capacity can be operated, which exhibit high stability and which allow a large number of charging and discharging cycles to be carried out. The redox-active compounds used according to the invention make RFB with redox-active compounds accessible for "high-temperature" use.

The invention is based on the objective of providing an RFB or a hybrid RFB with the above property profile.

A further objective of the present invention is to provide an RFB which can be operated at elevated temperatures without the electrolyte used undergoing significant decomposition.

A further subtask is to provide a hybrid RFB which requires a small number of storage devices, preferably only one storage device, and in which it is also possible to dispense with the use of a membrane in the electrolytic cell.

This objective is solved by providing the devices described in claims 1 and 2.

A further subtask lies in the provision of a hybrid RFB which manages with a small number of storage devices, preferably with only one storage device, and in which, in addition, the use of a membrane in the electrolysis cell can be dispensed with. This sub-task is solved by providing the hybrid RFB described in claim 2.

In a first embodiment, the invention relates to a redox flow battery for storing electrical energy comprising a reaction cell with two electrode chambers for catholyte and anolyte, which are each connected to at least one liquid reservoir, the electrode chambers being separated by a membrane, being equipped with electrodes, and each being filled with electrolyte solutions which contain redox-active components dissolved or dispersed in an aqueous electrolyte solvent, as well as conductive salts dissolved therein and possibly further additives. The apparatus of this first embodiment is characterized in that the at least one liquid reservoir is an underground storage means in which temperatures of at least 30° C. prevail, in that the concentration of the salts dissolved in the electrolyte solutions is at least 10% by weight, in that the anolyte contains a water-soluble or water-dispersible redox-active component, and that the catholyte contains at least one compound or composition selected from one of the groups a), b), c), d) or e) as redox-active component, wherein a) is an organic compound comprising at least one redox-active residue of formula (I)

$$(X\text{—}C_5H_4)Fe(Y\text{—}C_5H_3\text{—}Z) \qquad (I),$$

b) is an organic compound comprising at least one redox-active residue of formula (Ia)

(Ia)

in combination with hydrochloric acid and/or a salt selected from the group consisting of ammonium salts with inorganic or organic anions, preferably with chloride or fluoride anions, salts with tetrafluoroborate anions or salts of trifluoromethanesulfonic acid, c) is an organic compound comprising at least one redox-active residue of the formula (Ib)

(Ib)

d) is an organic compound comprising at least one redox-active residue of the formula (Ic)

(Ic)

e) is a water-soluble iron salt complexed with nitrogen-containing ligands, wherein X is a residue of the formula —$(C_nH_{2n})$-FG or of the formula —$(C_wH_{2w})$-SP-$(C_nH_{2n})$-FG or of the formula —$(C_nH_{2n})$-Brgp-, Y is hydrogen or a residue of the formula —$(C_nH_{2n})$-FG or of the formula —$(C_wH_{2w})$-Sp-$(C_nH_{2n})$-FG Z is hydrogen or a covalent bond linking the residue of formula (I) to the remainder of the molecule, FG is a functional group selected from —OH, —SH, —$NO_3$, —$NO_2$, —CN, —$OR_1$, —$SR_1$, —(O—$CH_2$—$CH_2)_o$—$OR_2$, —(O—$CH_2$—$CH_2)_o$—$NR_3R_4R_5^+$$(An^{m-})_{1/m}$, —$COR_2$, —$COO^-(Kat^{u+})_{1/u}$, —$COOR_2$, —$SO_3^-(Kat^{u+})_{1/u}$, —$SO_3R_2$, —$SO_4^-(Kat^{u+})_{1/u}$, —$SO_4R_2$, —$PO_4^{2-}(Kat^{u+})_{2/u}$, —$PO_4(R_2)_2$, —$PO_3^{2-}$$(Kat^{u+})_{2/u}$, —$PO_3(R_2)_2$, —$NR_3R_4R_5^+(An^{m-})_{1/m}$, —$N^+R_3R_4$—$C_tH_{2t}$—$SO_3^-$ or —$NR_2$—$SO_2$—$R_3$ ist, Brgp is a divalent bridging group linking the residue of formula (I) to the remainder of the molecule, Sp is —O— or —S—, $R_1$ is $C_1$-$C_4$ alkyl, $R_2$ is hydrogen or $C_1$-$C_4$ alkyl, $R_3$, $R_4$ and $R_5$ independently of one another represent hydrogen or alkyl, Kat is an u-valent cation, An is an m-valent anion, m and u independently of one another are integers between 1 and 4, n and w independently of one another are integers between 2 and 4, and preferably 2, and o is an integer from 1 to 50, preferably from 3 to 20, t is an integer between 2 and 5, $R_7$, $R_8$, $R_9$ and $R_{10}$ represent alkyl oder each of $R_7$ and $R_8$ and $R_9$ and $R_{10}$ together with the common carbon atom form a cycloaliphatic or heterocyclic residue, Q is —O—, —S—, —NH—, —$NR_{13a}$—, —$NR_{13a}R_{13b}^+$—$(An^{m-})_{1/m}$, —$PR_{13a}$— or —$SiR_{13a}R_{13b}$—, or —Q— represents a covalent bond, $R_{11}$ is —O or —S, $R_{12}$ is —$CH_2$—, —O—, —S—, —SO—, —$SO_2$— $NR_{13}$— or —$N^+R_{13}R_{14}$—$(An^{m-})_{1/m}$, $R_{13}$, $R_{13a}$, $R_{13b}$ and $R_{14}$ independently of one another are monovalent organic residues, preferably alkyl and especially preferred $C_1$-$C_4$-alkyl, and An and m have the meanings defined above.

In a second embodiment, the invention relates to a redox flow battery for storing electrical energy, comprising a reaction cell with an electrode chamber for an electrolyte solution, which is connected to at least one liquid reservoir, the electrode chamber being equipped with a cathode and an anode, optionally having a membrane which divides the electrode chamber into a cathode space and an anode space, the electrode chamber being filled with electrolyte solution which contains redox-active components dissolved or dispersed in an aqueous electrolyte solvent, as well as conductive salts dissolved therein and optionally further additives. The apparatus of this second embodiment is characterized in that the at least one liquid reservoir is an underground storage means in which temperatures of at least 30° C. prevail, in that the concentration of the salts dissolved in the electrolyte solutions is at least 10% by weight, in that the anolyte contains a water-soluble or water-dispersible redox-active component, and that the catholyte contains at least one compound or composition selected from one of the groups a), b), c), d) or e) as redox-active component, wherein these groups have the above-defined meanings.

The invention thus relates to an RFB, also in the embodiment of a hybrid RFB, which uses underground storage means, in particular caverns, as a storage tank and thereby utilizes brine liquid (i.e. concentrated salt solution mainly sodium chloride or potassium chloride dissolved therein).

Underground storage means for the purposes of this description means, in a broad sense, an underground formation capable of being charged and discharged with large quantities of electrolyte. This may be caverns or porous rock layers. Temperatures of at least 30° C. prevail in underground storage means used in accordance with the invention.

A cavern is understood to be a larger underground cavity, either natural or artificially created in a closed construction.

For example, caverns formerly intended as gas storage facilities or as petroleum storage facilities can be used as underground storage means within the scope of the present invention. However, exploited petroleum or natural gas reservoirs can also be used, or caverns that have been specially manufactured for the purpose of operating RFB.

For the operation of RFBs according to the invention, no above-ground containers or tanks for the storage of electrolyte are required. This can reduce the plant and cost requirements for stockpiling electrolyte for high capacity RFB. No extensive piping system is required to interconnect a large number of tanks or containers.

The underground storage means used according to the invention, for example, is a subterranean cavity or a subterranean rock formation, which may be located several hundred meters below the earth's surface.

The electrolyte received in the underground storage means is usually a catholyte or an anolyte for an RFB, although these may preferably be present together in one electrolyte.

Salt dome caverns may be used as preferred underground storage means. These can be created in a known manner by flushing or brining out a salt layer in the subsurface. Thus, an underground cavity can be created using known methods to serve as an underground storage means for storing electrolyte for an RFB.

Alternatively, an existing cavern originally intended for gas or petroleum storage can be used to stock electrolyte for an RFB.

It is understood that in addition to salt dome caverns, other types of caverns, such as granite caverns, are also suitable for the storage of electrolyte for an RFB.

In a preferred embodiment, it may be provided that the cavern is bounded at least in sections, in particular completely, by rock, e.g. granite. Such caverns were originally intended for the storage of gas or crude oil and can be converted into an underground storage means for an RFB without any additional burden on the environment.

For example, a gas or petroleum cavern already flooded with brine can be connected to a circuit of an RFB, and redox-active compounds can be added to the brine as it circulates. The brine can be enriched with redox-active compounds by adding them to the brine above ground. In this way, large storage capacities can be developed as battery storage for an RFB with comparatively little effort.

Underground storage means used according to the invention typically have volumes of at least 20,000 $m^3$, preferably from 70,000 $m^3$ to 1,000,000 $m^3$ or, in particular, from 500,000 $m^3$ to 800,000 $m^3$.

As far as the geological and technical boundary conditions allow, the volume of an underground storage means intended to serve as battery storage for an RFB is freely scalable, and can also hold more than one million cubic meters of electrolyte.

Several underground storage means can also be interconnected. Series and parallel connections are possible.

The redox-active compounds used in the RFB according to the invention can be low-molecular organic molecules, oligomers or polymers. These molecules may be dissolved in the electrolyte solution or may be present as particles dispersed or suspended, for example as dispersions, microgels or as nanogels. The redox-active compounds contain at least one residue of the formula (I), or at least one residue of the formula (Ia) in combination with hydrochloric acid and/or selected salts, or at least one residue of the formulae (Ib) or (Ic).

Preferably, the redox-active compounds used in the electrolyte solution according to the invention are water-soluble. However, compounds that are dispersible in water can also be used.

Water-soluble iron salts can also be used in the catholyte of the RFB according to the invention. These are used in the form of complexes with nitrogen-containing ligands. Examples of suitable ligands are amino acids, in particular glycine, amines, in particular polyamines, or ethylenediamine derivatives, such as EDTA.

Water solubility of a compound is understood in the context of this description to mean a solubility of at least 1 g of the compound in 1 L of water at 25° C.

In the context of this description, low-molecular-weight molecules are understood to mean compounds which have no recurring structural units derived from monomers and which contain at least one, preferably one to six, particularly preferably one to four, especially one to three and very particularly preferably one or two residues of the formula (I), (Ia), (Ib) or (Ic).

In the context of this description, oligomeric molecules are compounds which have two to ten recurring structural units derived from monomers, each of which carries a residue of the formula (I), (Ia), (Ib) or (Ic). The residues of formula (I) may also be attached to the oligomer backbone via spacers.

In the context of this description, polymeric molecules are compounds which have more than ten, preferably eleven to fifty, recurring structural units derived from monomers, each of which carries a residue of the formula (I), (Ia), (Ib) or (Ic). The residues of the formula (I) can also be attached to the polymer backbone via spacers.

In a preferred embodiment, redox-active components having from one to six, preferably from one to four, in particular from one to three and most preferably from one to two residues of formula (I), (Ia), (Ib) or (Ic) in the molecule are used in the RFB or hybrid RFB according to the invention.

Examples of preferably used low molecular weight, oligomeric and polymeric redox-active compounds are given below.

The molar masses of the redox-active compounds containing at least one residue of the formula (I), (Ia), (Ib) or (Ic) used in the RFB or hybrid RFB according to the invention can vary in wide ranges. Particularly preferred are redox-active compounds containing residues of the formula (I), (Ia), (Ib) or (Ic) whose molecular weights are in the range from 150 to 80,000 g/mol, preferably in the range from 250 to 50,000 g/mol and very preferably in the range from 500 to 20,000 g/mol.

The viscosity of the electrolytes used in the RFB or hybrid RFB according to the invention is typically in the range from 1 mPas up to $10^3$ mPas, in particular preferably 1 to $10^2$ mPas and most preferably 1 to 20 mPas (measured at 25° C. with a rotational viscometer, plate/plate).

A group of the redox-active compounds used according to the invention is characterized by the presence of at least one group X on at least one cyclo-pentadienyl ring. Group X consists of a solubility-mediating group FG, which is preferably bonded to a cyclopentadienyl ligand of the ferrocene via an alkylene spacer having up to four carbon atoms or via an alkylene-oxide-alkylene group having up to four carbon atoms as spacer or via an alkylene-sulfide-alkylene group having up to four carbon atoms as spacer, or of an alkylene spacer having a divalent bridging group Brgp, which connects the residue of the formula (I) to the remainder of the molecule.

The alkylene spacer may be a residue of the formula $-CH_2-CH(CH_3)-$, $-(CH_2)_3-$, $-(CH_2)_4-$ or in particular $-(CH_2)_2-$.

The alkylene oxide alkylene spacer may be a residue of the formula $-CH_2-CH(CH_3)-O-CH_2-CH(CH_3)-$, $-(CH_2)_3-O-(CH_2)_3-$, $-(CH_2)_4-O-(CH_2)_4-$ or in particular $-(CH_2)_2-O-(CH_2)_2-$.

The alkylene sulfide alkylene spacer may be a residue of the formula $-CH_2-CH(CH_3)-S-CH_2-CH(CH_3)-$, $-(CH_2)_3-S-(CH_2)_3-$, $-(CH_2)_4-S-(CH_2)_4-$ or in particular $-(CH_2)_2-S-(CH_2)_2-$.

The divalent bridging group Brgp may be any divalent residue linking the residue of formula (I) to the remainder of the molecule, for example to a polymer backbone.

Examples of bridging groups Brgp include alkylene, $-O-$, $-S-$, $-SO-$, $-SO_2-$, $-CO-$, $-CO-O-$, $-NR_2-$, $-CO-NR_2-$ and $-SO_2NR_2-$.

Particularly preferred are aqueous electrolyte solutions containing a compound with at least one redox-active residue of the formula (I) in which n is 2.

These compounds have a particularly favorable combination of water solubility and temperature stability. In addition, such compounds are particularly accessible synthetically by treating the cyclopentadienyl ring of the ferrocene with butyllithium and then reacting it with ethylene oxide. Further residues can be introduced via the resulting OH group. In addition, vinyl ferrocene can be functionalized by reaction with thiols containing the FG group.

Besides the group X, the residues of the formula (I) in the redox-active compounds used according to the invention can contain a further residue of the formula $-(C_nH_{2n})-FG$ or of the formula $-(C_wH_{2w})-O-(C_nH_{2n})-FG$ or of the formula $-(C_wH_{2w})-S-(C_nH_{2n})-FG$ (residue Y) on a cyclopentadienyl ring. However, Y is preferably hydrogen.

In the RFBs according to the invention, electrolyte solutions with a high salt concentration are used, which contain water or water and an organic solvent, in addition to the above-mentioned redox-active compound(s), conducting salts and possibly other substances dissolved therein. The conducting salts serve primarily to balance the charge during charging or discharging of the battery. Other substances dissolved in the electrolyte, also called auxiliary additives, have a positive influence on the stability or performance parameters of the battery.

Examples of electrolyte solvents are water or mixtures with water-miscible organic liquids. Water is particularly preferred.

The conductive salts are usually organic or inorganic salts. Examples are salts containing anions selected from the group consisting of halide ions (fluoride ion, chloride ion, bromide ion, iodide ion), hydroxide ions, anions of inorganic acids (e.g. phosphate ions, sulfate ions, nitrate ions, hexafluorophosphate ions, tetrafluoroborate ions, perchlorate ions, chlorate ions, hexafluoroantimonate ions, hexafluoroarsenate ions, cyanide ions) or anions of organic acids (e.g. acetate ions, formate ions, trifluoroacetic acid ions, trifluoromethanesulfonate ions, pentafluoroethanesulfonate ions, nonafluorobutanesulfonate ions, butyrate ions, citrate ions, fumarate ions, glutarate ions, lactate ions, malate ions, malonate ions, oxalate ions, pyruvate ions, tartrate ions). Particularly preferred are chloride and fluoride ions, hydroxide ions, phosphate ions, sulfate ions, perchlorate ions, hexafluorophosphate ions and tetrafluoroborate ions; as well as cations selected from the group of hydrogen ions ($H^+$), alkali or alkaline earth metal cations (e.g. lithium, sodium, potassium, magnesium, calcium), zinc, iron, and substituted or unsubstituted ammonium cations (e.g. tetrabutylammonium, tetramethylammonium, tetraethylammonium), wherein the substituents may generally be alkyl groups. Hydrogen ions, lithium ions, sodium ions, potassium ions, tetrabutylammonium ions and mixtures thereof are particularly preferred. In particular, the conducting salts: NaCl, KCl, $LiPF_6$, $LiBF_4$, $NaBF_4$, $NaPF_6$, $NaClO_4$, NaOH, KOH, $Na_3PO_4$, $K_3PO_4$, $Na_2SO_4$, $NaSO_3CF_3$, $LiSO_3CF_3$, $(CH_3)_4NOH$, n-$Bu_4NOH$, $(CH_3)_4NCl$, n-$Bu_4NCl$, $(CH_3)_4NBr$, n-$Bu_4NBr$, n-$Bu_4NPF_6$, n-$Bu_4NBF_4$, n-$Bu_4NClO_4$, $NH_4Cl$ and mixtures thereof wherein n-Bu represents the n-butyl group.

Particularly preferred electrolyte solutions used in RFBs according to the invention contain a conducting salt which contains anions selected from the group of halide ions, hydroxide ions, phosphate ions, sulfate ions, perchlorate ions, hexafluorophosphate ions or tetrafluoroborate ions, in particular a conducting additive composed of these anions and cations selected from the group of hydrogen ions, alkali metal or alkaline earth metal cations, and substituted or unsubstituted ammonium cations.

Examples of auxiliary additives are surfactants, viscosity modifiers, pesticides, buffers, stabilizers, catalysts, conductive additives, antifreeze agents, temperature stabilizers and/or foam breakers.

Surfactants can be nonionic, anionic, cationic or amphoteric. Nonionic surfactants (e.g. polyalkylene glycol ethers, fatty alcohol propoxylates, alkyl glucosides, alkyl polyglucosides, octylphenol ethoxylates, nonylphenol ethoxylates, saponins, phospholipids) are particularly preferred.

Examples of buffers include carbonic acid bicarbonate buffer, carbonic acid silicate buffer, acetic acid acetate buffer, phosphate buffer, ammonia buffer, citric acid buffer or citrate buffer, tris(hydroxymethyl)aminomethane, 4-(2-hydroxyethyl)-1-piperazineethanesulfonic acid, 4-(2-hydroxyethyl)piperazine-1-propanesulfonic acid, 2-(N-morpholino)ethanesulfonic acid, barbital acetate buffer).

The electrolyte solutions used in the RFB according to the invention have an elevated temperature. These occur during storage of the electrolyte solution in the underground storage means and thus also when the electrolyte solution is used in the electrode chamber(s) of the battery or accumulator, for example during charging and/or discharging processes.

Preferably used aqueous electrolyte solutions have temperatures of 30 to 90° C., in particular of 40 to 70° C.

The aqueous electrolyte solutions used contain at least one conducting salt, in particular such salts as are produced during the manufacture of caverns. The brine resulting from this method of production can preferably be used as the electrolyte solution in the RFB according to the invention.

The concentration of salts dissolved in the electrolyte solutions used according to the invention is very high. Preferably, the concentration of conducting salts is from 14 wt % to the saturation limit. Saturated salt solutions are frequently used, with some of the salts precipitated in the earth reservoir.

Particularly preferred RFB according to the invention have a state of charge of the catholyte or of the catholyte and the anolyte of less than 90%, in particular of up to 80% and very preferably of 70 to 80%. These RFB are characterized by a particularly good temperature stability of the redox-active compounds in the catholyte and in the anolyte. Of course, the state of charge of the catholyte or of the catholyte and the anolyte in the RFB of the invention may also be 100%.

The state of charge (SOC) is a characteristic value for the state of charge of the electrolyte solution or a battery containing this electrolyte solution. The state of charge value indicates the still available capacity of an electrolyte solution or a battery in relation to the nominal value. The state of charge is specified as a percentage of the fully charged state.

The state of charge can be determined, for example, by the open-circuit voltage (VOC). The open-circuit voltage here depends on the state of charge; this increases with increasing state of charge. The cell voltage is measured in the "open circuit", i.e. it is the cell voltage that results at a given state of charge without external load.

Also preferred in the operation of the RFB according to the invention are aqueous electrolyte solutions containing a compound with at least one redox-active residue of the formula (I), where Y is hydrogen and m is 1 or 2.

Further preferably used are aqueous electrolyte solutions containing a compound with at least one redox-active residue of formula (I), wherein FG is a functional group selected from $-(O-CH_2-CH_2)_o-OR_2$, $-(O-CH_2-CH_2)_o-NR_3R_4R_5^+(An^{m-})_{1/m}$, $-COR_2$, $-COO^-(Kat^{u+})_{1/u}$, $-SO_3^-(Kat^{u+})_{1/u}$, $-SO_4^-(Kat^{u+})_{1/u}$, $-PO_4^{2-}(Kat^{u+})_{2/u}$, $-PO_3^{2-}(Kat^{u+})_{2/u}$ or $-NR_3R_4R_5^+(An^{m-})_{1/m}$.

Examples of anions $An^{m-}$ are halide ions, such as the fluoride ion or the chloride ion, or hydroxide ions, anions of inorganic acids (e.g. phosphate ions, sulfate ions, nitrate ions, hexafluorophosphate ions, tetrafluoroborate ions, perchlorate ions, chlorate ions, hexafluoroantimonate ions, hexafluoroarsenate ions, cyanide ions), or anions of organic acids (e.g. acetate ions, formate ions, trifluoroacetic acid ions, trifluoromethanesulfonate ions, pentafluoroethanesulfonate ions, nonafluorobutane-sulfonate ions, butyrate ions, citrate ions, fumarate ions, glutarate ions, lactate ions, malate ions, malonate ions, oxalate ions, pyruvate ions, tartrate ions).

Preferred anions $An^{m-}$ are selected from the group of halide ions, hydroxide ions, phosphate ions, sulfate ions, perchlorate ions, hexafluorophosphate ions or tetrafluoroborate ions.

Examples of cations $Kat^{u+}$ are hydrogen cations, metal cations, ammonium cations or phosphonium cations.

Preferred cations $Kat^{u+}$ are hydrogen cations, alkali metal cations, alkaline earth metal cations or ammonium cations, in particular hydrogen cations, sodium, potassium, magnesium or calcium cations, or quaternary ammonium cations.

Particularly preferred aqueous electrolyte solutions contain a compound having at least one redox-active residue of the formula (I), where Z is a covalent bond which connects the residue of the formula (I) to a polymer backbone selected from the group consisting of polymethacrylates, polyacrylates, polystyrenes, polyalkylene glycols, polyalkylene imines or polyvinyl ethers, the polymer backbone preferably having from 5 to 100 groups of the formula (I).

Very preferably used aqueous electrolyte solutions contain oligomers or polymers containing recurring structural units of the formula (II) and optionally further structural units derived from solubility-facilitating comonomers (II)

wherein
ME is a recurring structural unit derived from a polymerizable monomer,
BG is a covalent bond or a bridging group
FC is a residue of the formula $(X-C_5H_4)Fe(Y-C_5H_3-Z)$,
X, Y and Z have the meanings defined above, and
r is an integer from 2 to 150, preferably from 2 to 80 and most preferably from 8 to 40.

Other particularly preferred aqueous electrolyte solutions contain oligomers or polymers containing recurring structural units corresponding to formula (V) and optionally other structural units derived from solubility-facilitating comonomers (V)

wherein
ME is a recurring structural unit derived from a polymerizable monomer,
BG is a covalent bond or a bridging group
Pip is a piperidinyl residue of formula (Ia), (Ib) or (Ic), and
r is an integer from 2 to 150, with the proviso that, in the case where Pip is a residue of the formula (Ia), the electrolyte solution additionally contains a salt selected from the group consisting of the ammonium salts with inorganic or organic anions, the salts with tetrafluoroborate anions or the salts of trifluoromethanesulfonic acid.

The recurring units ME and BG form the backbone of the oligomer or polymer, which contains several units of the redox-active unit of formula (I), (Ia), (Ib) or (Ic) defined above.

Examples of classes of substances which can form the backbone of the oligomer or polymer are polymers derived from ethylenically unsaturated carboxylic acids or their esters or amides, such as polymethacrylate, polyacrylate, polymethacrylamide or polyacrylamide, polymers derived from ethylenically unsaturated aryl compounds, such as polystyrene, polymers derived from vinyl esters of saturated carboxylic acids or their derivatives, such as polyvinyl acetate or polyvinyl alcohol, polymers derived from olefins or from bi- or polycyclic olefins, such as polyethylene, polypropylene or polynorbornene, polyimides derived from imide-forming tetracarboxylic acids and diamines, polymers derived from naturally occurring polymers and their chemically modified derivatives, such as cellulose or cellulose ethers, and polyurethanes, polyvinyl ethers, polythiophenes, polyacetylene, polyalkylene glycols and derivatives thereof, such as ethers thereof, for example polyethylene glycol or polyethylene glycol methyl ether, poly-7-oxanorbornene, polysiloxanes, or polyalkylene imines and derivatives thereof, such as amines thereof, for example polyethylene imines or N,N,N',N'-tetramethyl-polyethylene imines.

The following are examples of combinations of the structural units ME and the bridging groups BG for some of the above classes of substances. These are

| | | | |
|---|---|---|---|
| polymethacrylate | BG = —COO— | ME = | —(CH$_2$—C(CH$_3$))— |
| polyacrylate | BG = —COO— | ME = | —(CH$_2$—CH)— |
| polymethacrylamide | BG = —CONH— | ME = | —(CH$_2$—C(CH$_3$))$_{10}$— |
| polyacrylamide | BG = —CONH— | ME = | —(CH$_2$—CH)— |
| polystyrene | BG = covalent C—C-bond or —CH$_2$— or —NH— | ME = | —(CH$_2$—CH)— with phenyl |
| polyvinylacetate | BG = covalent C—C-bond | ME = | —(CH$_2$—CH)— with OC(=O)CH$_2$ |
| polyethylene | BG = covalent C—C-bond | ME = | —(CH$_2$—CH)— |
| polypropylene | BG = covalent C—C-bond | ME = | —(CH$_2$—C(CH$_3$))— |
| polyvinylether | BG = —O— | ME = | —(CH$_2$—CH)— |
| polyethylenimine | BG = covalent N—C-bond | ME = | —(CH$_2$—CH$_2$—N)— |

Particularly preferred classes of substances which form the backbone of the oligomer or polymer are polymethacrylates, polyacrylates, polymethacrylamides, polyacrylamides, polystyrene, polyethyleneimines and polyvinyl ethers.

The redox-active units of formulae (I), (Ia), (Ib) oder (Ic) are covalently bonded to the polymer backbone.

The polymers containing redox-active components may be linear polymers or they may be comb and star polymers, dendrimers, ladder polymers, ring-shaped polymers, polycatenanes and polyrotaxanes.

Preferably, comb and star polymers, dendrimers, ladder polymers, ring-shaped polymers, polycatenanes and polyrotaxanes are used. These types are characterized by increased solubility and the viscosity of the solutions obtained is usually lower than for corresponding linear polymers.

The solubility of the polymers containing redox-active components used according to the invention can be further improved by co-polymerization or functionalization, e.g. with polyethylene glycol, polymethacrylic acid, polyacrylic acid or polystyrene sulfonate.

Preferred solubility-facilitating comonomers are vinyl acetate, methyl vinyl ether, methacrylic acid, acrylic acid, methacrylic acid alkyl ester, acrylic acid ethyl ester, methacrylic acid amide, acrylic acid amide, vinyl sulfonate, vinyl phosphonic acid or styrene sulfonate.

The preparation of the redox-active compounds used according to the invention can be carried out by conventional methods. Oligomers and polymers can be prepared by the usual polymerization processes. Examples include polymerization in substance, polymerization in solution or emulsion or suspension polymerization. These procedures are known to the person skilled in the art.

X is —O— or —S—, preferably —O—.

Q is preferably —O— or —S—, in particular —O—, or —Q— is preferably a covalent bond. Low molecular weight compounds containing one or more residues of formula (I) typically have the following structure (X—C$_5$H$_4$)Fe(Y—C$_5$H$_3$—)—R$_{22}$, wherein X and Y have the meanings defined above, and R$_{22}$ is hydrogen or a mono- or polyvalent, in particular a mono- to hexavalent organic residue which may optionally contain further (X—C$_5$H$_4$)Fe(Y—C$_5$H$_3$—)- residues.

Very preferably, aqueous electrolyte solutions used contain, as redox-active compound, a compound of the formula (III)

(X—C$_5$H$_4$)Fe(Y—C$_5$H$_4$)  (III), wherein X and Y have the meanings defined above.

Other very particularly preferred aqueous electrolyte solutions contain, as redox-active compound, a compound of the formula (IV)

[(X—C$_5$H$_4$)Fe(Y—C$_5$H$_3$)]—R$_{23}$—[(C$_5$H$_3$—Y)Fe(C$_5$H$_4$—X)]$_p$  (IV), wherein X and Y are as defined above,

R$_{23}$ is a two- to tetravalent organic group, and p is an integer from 1 to 4.

Other aqueous electrolyte solutions preferably used contain a compound having at least one redox-active residue of the formulae (Ia), (Ib) or (Ic), which is covalently bonded to a polymer backbone selected from the group consisting of polymethacrylates, polyacrylates, polystyrenes, polyalkylene glycols, polyalkylene imines or polyvinyl ethers, the polymer backbone preferably having 5 to 100 groups of the formula (Ia), (Ib) or (Ic).

Preferred aqueous electrolyte solutions contain compounds with one or more residues of the formula (Ia), (Ib) or (Ic) and with the following structure Pip-R$_{15a}$-(Pip)$_x$, in which Pip is a residue of the formula (Ia), (Ib) or (Ic)

x is an integer from 0 to 5, preferably from 0 to 3, and

R$_{15a}$ is a one- to six-valent organic residue or —O— or —S—, with the proviso that, in the case where Pip is a residue of the formula (Ia), the electrolyte solution additionally contains hydrochloric acid and/or a salt selected from the group consisting of the ammonium salts with inorganic or organic anions, the salts with tetrafluoroborate anions or the salts of trifluoromethanesulfonic acid.

Other particularly preferred aqueous electrolyte solutions contain a redox-active compound of the formula (VIa) or (VIb)

(VIa)

(VIb)

wherein R$_7$, R$_8$, R$_9$, R$_{10}$ and R$_{11}$ are as defined above, q is an integer from 1 to 3,

R$_{15}$ is a monovalent organic residue optionally linked to the piperidinyl residue by an oxygen, sulfur or nitrogen atom, and

R$_{16}$ is —O—, —S— or a two- to tetravalent organic residue.

Very preferably, aqueous electrolyte solutions used contain a redox-active compound of the formula (VII), (VIII), (IX), (X) or (XI)

(VII)

(VIII)

-continued wherein $R_7$, $R_8$, $R_9$, $R_{10}$, $R_{11}$, $R_{12}$, Q, ME, BG, r and q are as defined above,
$R_{16a}$ is a di- to tetravalent organic residue, and
t is 0 or 1.

Other very particularly preferred aqueous electrolyte solutions contain a compound of the formula (VIa) defined above, in which $R_{15}$ is —O—$(C_sH_{2s})$—$R_{23}$, —S—$(C_sH_{2s})$—$R_{23}$ or —$NR_2$—$(C_sH_{2s})$—$R_{23}$,
s is an integer from 2 to 4,
$R_2$ has one of the meanings defined above,
$R_{23}$ is a functional group selected from —OH, —SH, —$NO_3$, —$NO_2$, —CN, —$OR_{17}$, —$SR_{17}$, —(O—$CH_2$—$CH_2$)$_v$—$OR_{18}$, —(O—$CH_2$—$CH_2$)$_v$—$SR_{17}$, —$COR_{18}$, —$COO^-(Kat^{u+})_{1/u}$, —$COOR_{18}$, —$SO_3^-$ $(Kat^{u+})_{1/u}$, —$SO_3R_{18}$, —$SO_4^-(Kat^{u+})_{1/u}$, —$SO_4R_{18}$, —$PO_4^{2-}(Kat^{u+})_{2/u}$, —$PO_4(R_{18})_2$, —$PO_3^{2-}(Kat^{u+})_{2/u}$, —$PO_3(R_{18})_2$ or —$NR_{19}R_{20}R_{21}^+(An^{m-})_{1/m}$,
$R_{17}$ is $C_1$-$C_4$ alkyl,
$R_{18}$ is hydrogen or $C_1$-$C_4$ alkyl,
$R_{19}$, $R_{20}$, $R_{21}$ and $R_{22}$ independently of one another are hydrogen or alkyl, in
particular each is methyl,
Kat is an u-valent cation,
An is an m-valent anion,
m and u independently of one another are integers from 1 to 4, and
v is an integer from 1 to 50.

In preferred redox flow batteries of the invention, redox-active compounds containing one or more residues of the formula (Ia) and a stabilizing additive are used, the stabilizing additive being selected from the group of ammonium salts with inorganic or organic anions, preferably with chloride or fluoride anions, salts with tetrafluoroborate anions or salts of trifluoromethanesulfonic acid. In particular, ammonium cations or metal cations are present as cations of these $BE_4$ or trifluoromethanesulfonic acid salts.

Preferably, hydrochloric acid or ammonium halides are used as additives. The latter are usually quaternary ammonium halides, in particular quaternary ammonium alkyl halides. The alkyl groups have in particular 1-4 carbon atoms, which are preferably substituted with a hydroxy group.

Quaternary ammonium chlorides or fluorides are particularly preferred. The salts with tetrafluoroborate anions or the salts of trifluoromethanesulfonic acid are preferably salts with alkali metal cations, alkaline earth metal cations or ammonium cations, in particular with sodium, potassium, magnesium or calcium cations, or with quaternary ammonium cations.

Very preferably, aqueous electrolyte solutions containing a compound with at least one redox-active residue of the formula (Ic) in which Y is —O—, —S—, —SO—, —$SO_2$—, —$NR_{13}$— or —$N^+R_{13}R_{14}$—$(An^{m-})_{1/m}$ are used. These exhibit increased water solubility compared to compounds with Y=—$CH_2$—. These compounds have a particularly favorable combination of water solubility and temperature stability.

Further preferred redox flow batteries of the invention contain an iron solid cathode with the redox pair iron(II)/iron(0) or iron(III)/iron(0); very preferably, this redox pair is used in combination with a zinc solid anode with the redox pair zinc (II)/zinc(0).

By $R_{22}$, $R_{23}$, $R_{15a}$, $R_{16}$ and $R_{16a}$ as a two- to tetravalent organic group is meant an organic residue which is linked to the remainder of the molecule by two, three or four covalent bonds.

Examples of divalent organic residues include alkylene, alkyleneoxy, poly(alkylene-oxy), alkyleneamino, poly(alkyleneamino), cycloalkylene, arylene, aralkylene, or heterocyclylene.

Alkylene groups can be either branched or unbranched. An alkylene group typically contains one to twenty carbon atoms, preferably two to four carbon atoms. Examples of alkylene groups include: methylene, ethylene, propylene and butylene. Alkylene groups may be optionally substituted, for example, with carboxylic or sulfonic acid groups, with carboxylic ester or sulfonic ester groups, with carboxylamide or sulfonic acid amide groups, with hydroxyl or amino groups, or with halogen atoms.

Alkyleneoxy and poly(alkyleneoxy) groups may contain both branched and unbranched alkylene groups. An alkylene group occurring in an alkyleneoxy or in a poly(alkyleneoxy) group typically contains two to four carbon atoms, preferably two or three carbon atoms. The number of repeating units in poly(alkyleneoxy) groups can vary over wide ranges. Typical numbers of repeat units range from 2 to 50. Examples of alkyleneoxy groups include: ethyleneoxy, propyleneoxy, and butyleneoxy. Examples of poly(alkyleneoxy) groups are: poly(ethyleneoxy), poly(propyleneoxy) and poly(butyleneoxy).

Alkyleneamino and poly(alkyleneamino) groups may contain both branched and unbranched alkylene groups. An alkylene group occurring in an alkyleneamino or in a poly(alkyleneamino) group typically contains two to four carbon atoms, preferably two or three carbon atoms. The number of repeating units in poly(alkyleneamino) groups can vary over wide ranges. Typical numbers of repeat units range from 2 to 50. Examples of alkyleneamino groups include: ethyleneamino, propyleneamino and butyleneamino. Examples of poly(alkyleneamino) groups are: poly(ethylene-amino), poly(propyleneamino) and poly (butyleneamino).

Cycloalkylene groups typically contain five, six or seven ring carbon atoms, each of which may be independently substituted. Examples of substituents include alkyl groups or two alkyl groups which, together with the ring carbons to which they are attached, can form another ring. An example of a cycloalkylene group is cyclohexylene. Cycloalkylene groups may optionally be substituted, for example, with carboxylic or sulfonic acid groups, with carboxylic ester or sulfonic ester groups, with carboxylamide or sulfonic acid amide groups, with hydroxyl or amino groups, or with halogen atoms.

Arylene groups are typically cyclic aromatic groups containing five to fourteen carbon atoms, each of which may be independently substituted. Examples of arylene groups include o-phenylene, m-phenylene, p-phenylene, o-biphenylyl, m-biphenylyl, p-biphenylyl, 1-naphthyl, 2-naphthyl, 1-anthryl, 2-anthryl, 9-anthryl, 1-phenantolyl, 2-phenantolyl, 3-phenantolyl, 4-phenantolyl, or 9-phenantolyl. Arylene groups may be optionally substituted, for example, with carboxylic or sulfonic acid groups, with carboxylic ester or sulfonic ester groups, with carboxylamide or sulfonic acid amide groups, with hydroxyl or amino groups, or with halogen atoms. Other examples of substituents include alkyl groups or two alkyl groups which, together with the ring carbon atoms to which they are attached, can form another ring.

Heterocyclylene groups are typically cyclic groups with four to ten ring carbon atoms and at least one ring heteroatom, each of which may be independently substituted. Examples of heteroatoms include oxygen, nitrogen, phosphorus, boron, selenium or sulfur. Examples of heterocyclylene groups include furandiyl, thiophendiyl, pyrroldiyl, or imidazole diyl. Heterocyclylene groups are preferably aromatic. Heterocyclyl groups may be optionally substituted, for example, with carboxyl or sulfonic acid groups, with carboxylic ester or sulfonic ester groups, with carboxylamide or sulfonic acid amide groups, with hydroxyl or amino groups, or with halogen atoms. Further examples of substituents are alkyl groups, or two alkyl groups which together with the ring carbon atoms to which they are attached can form a further ring.

Aralkylene groups are typically aryl groups to which one or two alkyl groups are covalently bonded. Aralkyl groups may be covalently bonded to the remainder of the molecule through their aryl moiety and their alkyl moiety or through two alkyl moieties. The aralkylene group may be substituted on the aromatic ring, for example, with alkyl groups or with halogen atoms. Examples of aralkylene groups are benzylene or dimethylphenylene (xylylene).

Examples of $R_{22}$, $R_{23}$, $R_{15a}$, $R_{16}$ and $R_{16a}$ as three-valent organic residue are alkyltriyl, alkoxytriyl, tris-poly(alkyleneoxy), tris-poly(alkyleneamino), cycloalkyltriyl, aryltriyl, aralkyltriyl or heterocyclyltriyl. These residues correspond to the divalent residues described in detail above, with the difference that they are linked to the remainder of the molecule with three covalent bonds instead of two covalent bonds.

Examples of $R_{22}$, $R_{23}$, $R_{15a}$, $R_{16}$ and $R_{16a}$ as tetravalent organic residue are alkylquaternyl, alkoxyquaternyl, quaterpoly(alkylenoxy), quaterpoly(alkylenamino), cycloalkylquaternyl, arylquaternyl, aralkylquaternyl or heterocyclylquaternyl. These residues correspond to the divalent residues already described in detail above, with the difference that they are linked to the remainder of the molecule with four covalent bonds instead of two covalent bonds.

By $R_{22}$, $R_{15}$ or $R_{15a}$ as a monovalent organic residue is meant an organic residue linked to the remainer of the molecule by a covalent bond.

Examples of residues $R_{15}$ or $R_{15a}$ are alkyl, alkoxy, alkylamino, cycloalkyl, aryl, aralkyl or heterocyclyl. These residues correspond to the divalent residues already described in detail above, with the difference that they are linked to the remainder of the molecule with one covalent bond instead of two covalent bonds. $R_{15}$ or $R_{15a}$ may be linked to the remainder of the molecule via carbon atoms or via heteroatoms, for example via a nitrogen atom or an oxygen atom.

Preferred are redox flow batteries of the first embodiment, in which the anolyte contains a compound containing one or more bipyridyl groups in the molecule as a redox active component.

These are typically compounds containing in the molecule at least one redox-active residue of the formula (IX) or of the formula (X), preferably one to six, in particular one to four, very preferably one to three and most preferably one to two residues of the formula (IX) or of the formula (X) in the molecule wherein
the lines extending from the nitrogen atoms in the structures of formulae IX and X represent covalent bonds connecting the structures of formulae IX and X to the remainder of the molecule,
$R_{24}$ and $R_{25}$ are independently alkyl, alkoxy, haloalkyl, cycloalkyl, aryl, aralkyl, heterocyclyl, halogen, hydroxy, amino, nitro or cyano,
An is an m-valent inorganic or organic anion,
b and c independently of one another are integers from 0 to 4, preferably 0, 1 or 2, in particular 0, and
m is an integer from 1 to 4.

The compounds containing one or more bipyridiyl groups in the molecule as the redox-active component may be low molecular weight organic molecules, oligomers or polymers. These preferably contain at least one residue of the formula (IX) or of the formula (X), which is linked to the remainder of the molecule via the covalent bonds.

Preferably, the redox-active compounds containing the residue of formula (IX) or of formula (X) are water-soluble. However, they may also be compounds which are dispersible in water.

Examples of anions $An^{m-}$ are described above.

Preferred redox-active components used in the anolyte are compounds of the formulae IXa or Xa wherein $R_{24}$, $R_{25}$, An, b, c and m are as defined above, $R_{26}$ and $R_{27}$ independently of one another are hydrogen, alkyl optionally substituted by a carboxylic ester, carboxylic amide, carboxylic acid, sulfonic acid or amino group, cycloalkyl optionally substituted by a carboxylic ester, carboxylic amide, carboxylic acid, sulfonic acid or amino group, aryl optionally substituted by a carboxylic ester, carboxylic amide, carboxylic acid, sulfonic acid or amino group, or aralkyl optionally substituted by a carboxylic ester, carboxylic amide, carboxylic acid, sulfonic acid or amino group, in particular $C_1$-$C_6$-alkyl, $C_1$-$C_6$-alkyl substituted by a carboxylic ester group, $C_1$-$C_6$-alkyl substituted by a carboxylic amide group, $C_1$-$C_6$-alkyl substituted by a carboxylic acid group, $C_1$-$C_6$-alkyl substituted by a sulfonic acid group, or $C_1$-$C_6$-alkyl substituted by an amino group, and very preferably propionate, isobutionate, ethyl or methyl, and $R_{28}$ and $R_{29}$ independently of one another are hydrogen, alkyl optionally substituted by a carboxylic ester, carboxylic amide, carboxylic acid, sulfonic acid or amino group, cycloalkyl optionally substituted by a carboxylic ester, carboxylic amide, carboxylic acid, sulfonic acid or amino group, aryl optionally substituted by a carboxylic ester, carboxylic amide, carboxylic acid, sulfonic acid or amino group, or aralkyl optionally substituted by a carboxylic ester, carboxylic amide, carboxylic acid, sulfonic acid or amino group, or two residues $R_{28}$ and $R_{29}$ together form a $C_1$-$C_3$-alkylene group, in particular $C_1$-$C_6$-alkyl, $C_1$-$C_6$-alkyl substituted by a carboxylic ester group, $C_1$-$C_6$-alkyl substituted by a carboxylic amide group, $C_1$-$C_6$-alkyl substituted by a carboxylic acid group, $C_1$-$C_6$-alkyl substituted by a sulfonic acid group, or $C_1$-$C_6$-alkyl substituted by an amino group, or together are ethylene, and very preferably propionate, isobutionate, ethyl or methyl, or together are ethylene.

Examples of particularly preferred compounds are N, N'-di-$C_1$-$C_4$-alkylbipyridyl cations with any anions for charge balance, for example N, N'-dimethylbipyridyl halides, such as N, N'-di-methylbipyridyl chlorides.

Preferred redox flow batteries of the first embodiment contain as anolyte an aqueous electrolyte solution having a temperature of at least 30° C., preferably from 40 to 90° C., and in particular from 40 to 70° C., which contains a redox-active compound comprising at least one residue of the formula (IX) or (X).

In further preferred redox flow batteries of this first embodiment, the electrode chambers for catholyte and anolyte are separated by a semipermeable membrane impermeable to the redox pairs in the catholyte and the anolyte. This may be a size exclusion membrane, for example, a dialysis membrane.

In further preferred redox flow batteries of this first embodiment, the electrode chambers for catholyte and anolyte are separated by a semi-permeable membrane impermeable to the redox couple in the catholyte, for example a size exclusion membrane, and the anolyte contains zinc salt as a redox active component.

Redox flow batteries of the second embodiment are characterized by the fact that they need only have one underground storage means and that no membrane needs to be used to separate the reaction cell into anode and cathode compartments.

Preferred redox flow batteries of this second embodiment contain no membrane and only one underground storage means or several underground storage means connected in series for the aqueous electrolyte solution.

Particularly preferred are redox flow batteries in which a zinc-solid anode with the redox pair zinc(II)/zinc(0) is used. Of these, redox flow batteries of the second embodiment are particularly preferred.

Examples of zinc salts for the redox flow batteries of the first and second embodiments include zinc chloride, zinc fluoride, zinc bromide, zinc iodide, zinc nitrate, zinc nitrite, zinc hydrogen carbonate, zinc sulfate, zinc perchlorate, zinc tetrafluoroborate, and zinc hexafluorophosphate. Besides zinc salts with inorganic anions, zinc salts with organic anions can also be used, for example zinc acetate, zinc oxalate or zinc formate.

In the second embodiment and in a preferred embodiment of the first type of redox flow battery according to the invention, zinc is used as a redox-active anode material. Particularly noteworthy are the different aggregate states that zinc can assume within the battery.

In the second embodiment and in a preferred variant of the first embodiment of the redox flow battery according to the invention, zinc is used as a redox-active anode material. Particularly noteworthy are the different aggregate states that zinc can assume within the battery.

During the charging process, zinc(II) cations dissolved in the electrolyte are reduced to elemental zinc(0) on the anode surface. Two electrons must be accepted for this. The active material zinc is therefore present in the battery in both dissolved and solid form.

The zinc solid anode can be permanently present as a metallic electrode, or it can be formed in situ during the battery charging process on an electrically conductive surface inside the chamber, by the reduction of zinc cations. The zinc cations can act both primarily as the active material, but also secondarily as a conductive additive or as part of a conductive additive mixture.

During the charging process, zinc(II) cations dissolved in the electrolyte are reduced to elemental zinc(0) on the anode surface. The anode can be made of any electrically conductive material, preferably metal, in particular zinc or zinc alloys. By accepting two electrons, metallic zinc is deposited on the electrode surface. In the reverse case, metallic zinc is transferred from the electrode surface by the release of two electrons into zinc ions, which accumulate in the anolyte.

Particularly preferred redox flow batteries according to the invention have a zinc solid anode with the redox pair zinc(II)/zinc(0).

The advantage over the fully organic redox flow batteries described above is, on the one hand, the reduction in production costs. The zinc anode is much more cost-efficient to produce than known organic anodes. On the other hand, the redox pair zinc(II))/zinc(0) is characterized by very good stability against external environmental influences, such as sensitivity to oxygen. Conventional systems must be kept oxygen-free; this significantly complicates battery design and increases operating costs. With the use of a zinc anode, this can be dispensed with completely.

Zinc also has a very high overvoltage in aqueous media, allowing an extremely high potential window. The potential window is the maximum voltage (potential range) that can be reached between the cathode and anode due to the position of the redox pairs, in the range of the electrochemical voltage series, without unwanted side reactions or decomposition of the redox-active species, the conductive additive, the electrolyte or any other component of the entire battery. Conventional aqueous flux batteries are limited to a potential window of about 1.2 V. When this is exceeded, hydrogen gas would otherwise be generated. By using a zinc anode, the potential window can be expanded to over 2 V. This leads to a considerable increase in electrical power per cell. Zinc has a very high overvoltage with respect to hydrogen, so despite the high voltage of 2 V, no hydrogen is formed at the anode and the battery can be operated safely.

The term "battery" is used in its broadest sense in the context of this description. It may refer to a single rechargeable electrochemical cell or a combination of several such electrochemical cells.

In addition to the components described above, the redox flow battery according to the invention may contain other elements or components customary for such cells.

In the redox flow battery according to the invention, selected redox-active components are used which are present in the chamber(s) in dissolved, liquid or dispersed form.

The redox potential of the redox-active component can be determined, for example, by cyclic voltammetry. This method is known to those skilled in the art (compare Allen J. Bard and Larry R. Faulkner, "Electrochemical Methods: Fundamentals and Applications," 2001, $2^{nd}$ edition, John Wiley & Sons; Richard G. Compton, Craig E. Banks, "Understanding Voltammetry," 2010, $2^{nd}$ edition, Imperial College Press).

The first type of redox flow battery according to the invention contains a semi-permeable or microporous membrane. This fulfills the following functions
 separation of the anode and cathode compartments
 retention of the redox active component in the catholyte and in the anolyte, i.e. retention of the cathode and the anode active material
 permeability for the conducting salts of the electrolyte which serve to balance the charge, i.e. for anions and/or cations of the conducting salt or for the charge carriers contained in the electrolyte in general.

The membrane can be a size exclusion membrane, e.g. a dialysis membrane, but also an ion-selective membrane. The membrane prevents the passage of the redox active components from the cathode compartment into the anode compartment and the passage of redox active components from the anode compartment into the cathode compartment. The passage of dissolved zinc(II) cations need not, but can also be inhibited by the membrane.

Depending on the application, the materials of the membrane can consist of plastics, ceramics, glasses, metals or textile fabrics. Examples of materials are organic polymers such as cellulose or modified cellulose, for example cellulose ether or cellulose ester, polyethersulfone, polysulfone, polyvinylidene fluoride, polyesters, polyurethanes, polyamides, polypropylene, polyvinyl chloride, polyacrylonitrile, polystyrene, polyvinyl alcohol, polyphenylene oxide, polyimides, polytetrafluoroethylene and their derivatives, or furthermore ceramics, glasses or felts. Membranes consisting of several materials (composites) are also possible.

The membranes and the resulting redox flow batteries can be used in various appearances. Examples include flat membranes, pocket filter construction, and wound modules. These embodiments are known to those skilled in the art. Preferably, flat membranes are used.

The thickness of the membrane used in accordance with the invention can vary over a wide range. Typical thicknesses are in the range between 0.1 µm and 5 mm, in particular preferably between 10 µm and 200 µm.

In addition to the redox-active components, electrolytes and optionally membranes described above, the redox flow cell according to the invention preferably contains further components. These are
 conveying means, such as pumps, as well as tanks and tubes for the transport and storage of redox-active components
 electrodes, preferably consisting of or containing graphite, graphite fleece, graphite paper, carbon nanotube carpets, activated carbon, carbon black or graphene
 optionally current conductors, such as graphite or metals.

The negative electrode preferably contains zinc and may further contain, for example, the following materials:
 stainless steel, Hastelloy or iron-chromium-nickel containing alloys, graphite, graphite nonwoven, graphite paper, carbon nanotube carpets, activated carbon, carbon black or graphene.

The redox flow batteries according to the invention contain current conductors as a further optional but preferred component. These have the task of establishing the best possible electrical contact between electrode material and the external current source or current sink.

Aluminum, aluminum alloys, copper, stainless steel, Hastelloy, iron-chromium-nickel alloys, noble metal-coated titanium or tantalum, in particular platinum- and/or iridium- and/or ruthenium oxide-coated titanium, niobium, tantalum, hafnium or zirconium can be used as current conductors in the redox flow batteries according to the invention.

All components that enable the transfer of electrical current to the electrodes are referred to as current collectors. The redox reactions take place at the electrodes (cathode and anode), which are in direct contact with the electrolyte.

The redox flow batteries according to the invention can be used in a wide variety of fields. In the broadest sense, this may involve the storage of electrical energy for stationary applications. The invention also relates to the use of redox flow batteries for these purposes.

Examples of applications include use as stationary storage for emergency power supply, peak load balancing, and intermediate storage of electrical energy from renewable energy sources, especially in the photovoltaic, hydropower and wind power sectors, from gas-, coal-, biomass-, tidal- and marine-power plants, and applications in the field of electromobility, such as storage in land, air and water vehicles.

The redox flow batteries according to the invention can be interconnected in a serial or parallel manner in a manner known per se.

The following examples explain the invention without limiting it thereto.

FIGS. 1 and 2 explain the redox flow battery according to the invention and its function by way of example.

Figure 1:
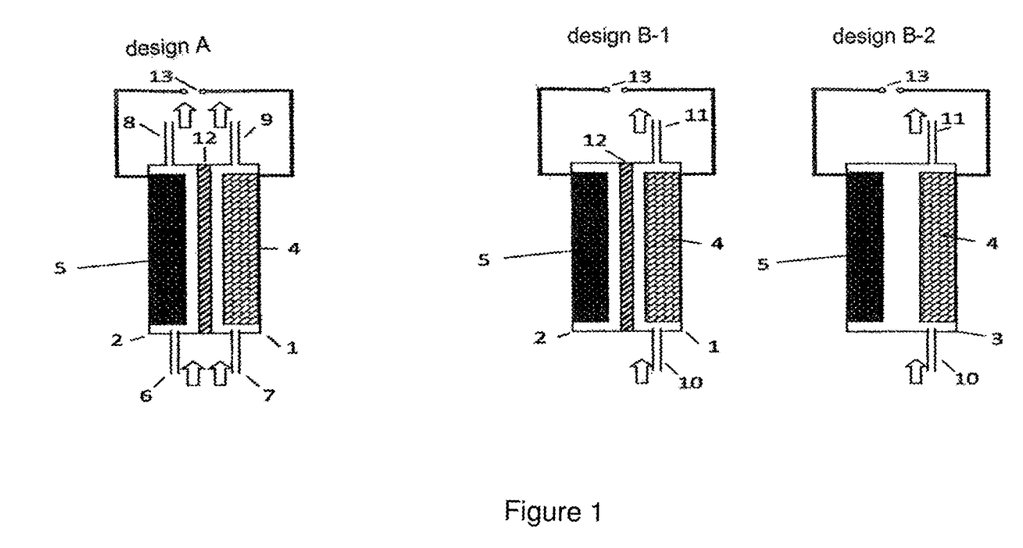
FIG. 1 shows schematic designs A, B-1 and B-2 of the electrochemical cell according to the invention without underground storage means.

FIG. 1 represents in design A an RFB or hybrid RFB with two separate electrolyte circuits, which must therefore be connected to at least two underground storage means.

Furthermore, FIG. 1 in design B-1 depicts a hybrid RFB with an electrolyte circuit, which must therefore be connected to at least one underground storage means. In design B-1, a membrane (12) is provided which divides the electrochemical cell into a cathode compartment and an anode compartment. Design B-2 of the hybrid RFB according to the invention differs from design B-1 by the absence of a membrane.

Shown in FIG. 1 in designs A and B-1 are the two polarity-specific chambers separated by a membrane (12) (one each for the catholyte (1) and the anolyte (2)) with the electrodes (4, 5). The two electrodes (4, 5) are used for charging and discharging the battery via the current arrester (13). In the case of design A, the electrolytes are supplied separately via the inflow ports (6, 7) and discharged separately again via the outflow ports (8, 9). In the case of design B, there is only one inflow nozzle (10) and one outflow nozzle (11). In the case of design B-2, only one chamber (3) with the electrodes (4, 5) is provided.

If the RFB according to the invention is operated as a hybrid RFB, metallic zinc is deposited on the electrode (5), the anode, or the anode consists of zinc and $Zn^{2+}$ ions are contained in the anolyte or the electrolyte solution contains $Zn^{2+}$ ions.

Figure 2:
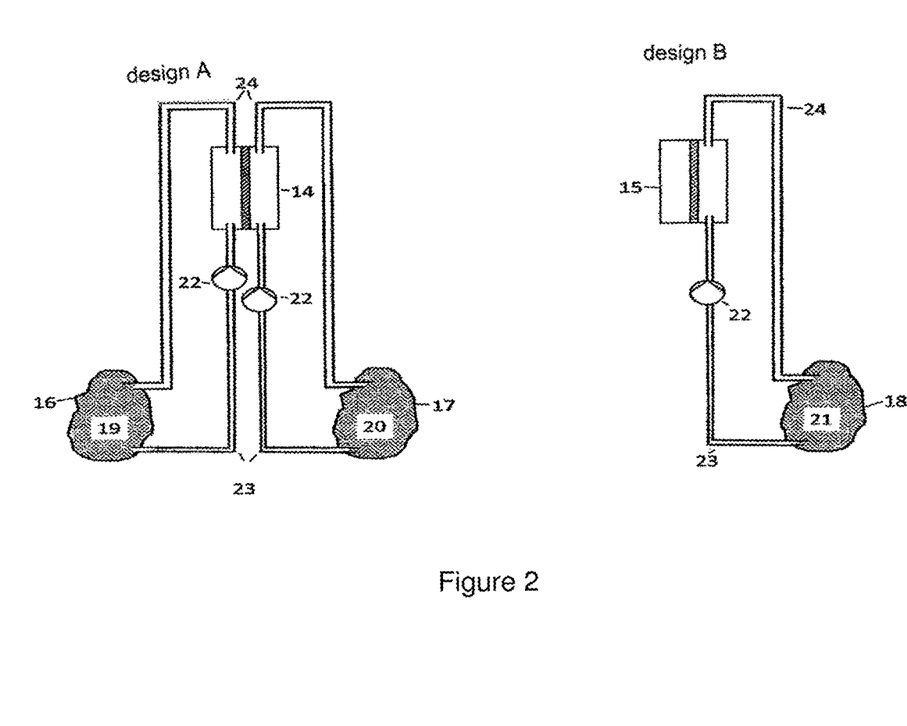
FIG. 2 shows schematic designs A, B-1 and B-2 of the RFB according to the invention, i.e. the electrochemical cell with underground storage mean(s).

FIG. 2 shows a sketch of design A of the RFB according to the invention. The electrochemical cell (14) is shown, which is connected to two caverns (16, 17). These are filled with anolyte (19) and catholyte (20), respectively. Via the piping (23), the anolyte and catholyte (19, 20) are conveyed from the respective caverns (16, 17) into the electrochemical cell (14) by means of pumps (22) and are returned to the caverns (16, 17) via the piping (24). Anolyte (19) and catholyte (20) have a high salt content (brine) in addition to the redox-active compounds. The above-mentioned ferrocene, 2,2,6,6-tetrasubstituted pyridinyl or iron compounds are used as redox-active components in the catholyte (20). For example, the above-mentioned bipyridyl compounds or zinc salts are used as redox-active components in the anolyte (19). Design A can be operated as a conventional RFB or as a hybrid RFB.

FIG. 2 also shows a sketch of design B of the RFB according to the invention. In this case, the design is considerably simplified. Here, the electrochemical cell (15) is connected to only one cavern (18). This is filled with electrolyte solution (21). The electrolyte solution (21) is conveyed from the cavern (18) into the electrochemical cell (15) via the piping (23) by means of a pump (22) and returned to the cavern (18) via the piping (24). The electrolyte solution (21) has a high salt content (brine) in addition to the redox-active compounds. Electrolyte solution (21) contains both active species in addition to highly concentrated conducting salts (brine), i.e. both a redox-active component for the anode and a redox-active component for the cathode. The above-mentioned ferrocene, 2,2,6,6-tetrasubstituted pyridinyl or iron compounds are used as redox-active components for the cathode. Zinc salts are used as redox-active components for the anode. Design B is operated as a hybrid RFB. The membrane shown schematically for design B in FIG. 2 can also be omitted.

The caverns (16, 17, 18) are each filled with brine containing redox-active components which are dissolved in the brine or in solid form (i.e. dispersed). If required, further conductive additives and further auxiliary additives can be additionally dissolved.

The invention claimed is:

1. A redox-flow-battery for storing electrical energy comprising a reaction cell with two electrode chambers for a catholyte and an anolyte, which are each connected to at least one liquid reservoir, the electrode chambers being separated by a membrane, being equipped with electrodes, and each being filled with electrolyte solutions which contain redox-active components dissolved or dispersed in an aqueous electrolyte solvent, as well as conductive salts dissolved therein and possibly further additives, characterized in that the at least one liquid reservoir is an underground storage means in which temperatures of at least 30° C. prevail, in that the concentration of the salts dissolved in the electrolyte solutions is at least 10% by weight, in that the anolyte contains a water-soluble or water-dispersible redox-active component, and that the catholyte contains at least one compound or composition selected from one of the groups b), c), or d) as redox-active component, wherein b) is an organic compound comprising at least one redox-active residue of formula (Ia)

(Ia)

in combination with hydrochloric acid and/or a salt selected from the group consisting of ammonium salts with inorganic or organic anions, salts with tetrafluoroborate anions or salts of trifluoromethanesulfonic acid, c) is an organic compound comprising at least one redox-active residue of the formula (Ib)

(Ib)

d) is an organic compound comprising at least one redox-active residue of the formula (Ic)

(Ic)

$R_7$, $R_8$, $R_9$ and $R_{10}$ represent alkyl or each of $R_7$ and $R_8$ and $R_9$ and $R_{10}$ together with the common carbon atom form a cycloaliphatic or heterocyclic residue, Q is —O—, —S—, —NH—, —$NR_{13a}$, —, —$NR_{13a}R_{13b}{}^+$—$(An^{m-})_{1/m}$, —$PR_{13a}$— or —$SiR_{13a}R_{13b}$—, $R_{11}$ is —O or —S, $R_{12}$ is —$CH_2$—, —O—, —S—, —SO—, —$SO_2$—$NR_{13}$— or —$N^+R_{13}R_{14}$— $(An^{m-})_{1/m}$, $R_{13}$, $R_{13a}$, $R_{13b}$ and $R_{14}$ independently of one another are monovalent organic residues, and An is an m-valent anion and m is an integer of 1-4.

2. A redox-flow-battery for storing electrical energy, comprising a reaction cell with an electrode chamber for an electrolyte solution, which is connected to at least one liquid reservoir, the electrode chamber being equipped with a cathode and an anode, the electrode chamber being filled with electrolyte solution which contains redox-active components dissolved or dispersed in an aqueous electrolyte solvent, as well as conductive salts dissolved therein and optionally further additives, characterized in that the at least one liquid reservoir is an underground storage means in which temperatures of at least 30° C. prevail, in that the concentration of the salts dissolved in the electrolyte solutions is at least 10% by weight, in that anolyte contains a water-soluble or water-dispersible redox-active component, and a catholyte contains at least one compound or composition selected from one of the groups b), c), or d) as redox-active component, wherein b) is an organic compound comprising at least one redox-active residue of formula (Ia)

(Ia)

in combination with hydrochloric acid and/or a salt selected from the group consisting of ammonium salts with inorganic or organic anions, salts with tetrafluoroborate anions or salts of trifluoromethanesulfonic acid, c) is an organic compound comprising at least one redox-active residue of the formula (Ib)

(Ib)

d) is an organic compound comprising at least one redox-active residue of the formula (Ic)

(Ic)

$R_7$, $R_8$, $R_9$ and $R_{10}$ represent alkyl or each of $R_7$ and $R_8$ and $R_9$ and $R_{10}$ together with the common carbon atom form a cycloaliphatic or heterocyclic residue, Q is —O—, —S—, —NH—, —$NR_{13a}$, —, —$NR_{13a}R_{13b}{}^+$—$(An^{m-})_{1/m}$, —$PR_{13a}$— or —$SiR_{13a}R_{13b}$—, $R_{11}$ is —O or —S, $R_{12}$ is —$CH_2$—, —O—, —S—, —SO—, —$SO_2$—$NR_{13}$— or —$N^+R_{13}R_{14}$—$(An^{m-})_{1/m}$, $R_{13}$, $R_{13a}$, $R_{13b}$ and $R_{14}$ independently of one another are monovalent organic residues, and An is an m-valent anion and m is an integer of 1-4.

3. The redox-flow-battery according to claim 1, characterized in that the electrode chambers for catholyte and anolyte are separated by a semi-permeable membrane impermeable to the redox couple in the catholyte, and the anolyte contains zinc salt as a redox-active component.

4. The redox-flow-battery according to claim 2, characterized in that the electrode chamber for catholyte and anolyte contains no membrane, and that the anolyte contains zinc salt as a redox-active component.

5. The redox-flow-battery according to claim 3, characterized in that this contains a zinc-solid anode with the redox pair zinc (II)/zinc(0).

6. The redox-flow-battery according to claim 1, characterized in that the temperature in the underground storage means is 30 to 90° C.

7. The redox-flow-battery according to claim 1, characterized in that the concentration of salts dissolved in the electrolyte solutions is from 14 wt % to the saturation limit.

8. The redox-flow-battery according to claim 1, characterized in that the state of charge of the catholyte or of the catholyte and the anolyte is less than 90%.

9. The redox-flow-battery according to claim 1, characterized in that $An^{m-}$ is selected from the group of halide ions, hydroxide ions, phosphate ions, sulfate ions, perchlorate ions, hexafluorophosphate ions or tetrafluoroborate ions.

10. The redox-flow-battery according to claim 1, characterized in that the electrolyte solution contains a compound having at least one redox-active residue of the formulae (Ia), (Ib) or (Ic), which is covalently bonded to a polymer backbone selected from the group consisting of polymethacrylates, polyacrylates, polystyrenes, polyalkylene glycols, polyalkylene imines or polyvinyl ethers.

11. The redox-flow-battery according to claim 1, characterized in that the electrolyte solution contains oligomers or polymers containing recurring structural units corresponding to formula (V) and optionally other structural units derived from solubility-facilitating comonomers (V)

wherein

ME is a recurring structural unit derived from a polymerizable monomer,

BG is a bridging group,

Pip is a piperidinyl residue of formula (Ia), (Ib) or (Ic), and r is an integer from 2 to 150.

12. The redox-flow-battery according to claim 1, characterized in that the electrolyte solution contains a redox-active compound of formula (VIa) or (VIb)

(VIa)

(VIb)

wherein $R_7$, $R_8$, $R_9$ and $R_{10}$ have the meaning defined in claim 1, q is an integer from 1 to 3,

$R_{15}$ is a monovalent organic residue, which is optionally linked via an oxygen, sulfur or nitrogen atom with the piperidinyl residue, and

$R_{16}$ is —O—, —S— or a di- to tetravalent organic residue.

13. The redox-flow-battery according to claim 1, characterized in that the electrolyte solution contains a redox-active compound of formula (VII), (VIII), (IX), (X) or (XI)

(VII)

(VIII)

(IX)

(X)

(XI)

wherein $R_7$, $R_8$, $R_9$, $R_{10}$, $R_{11}$, $R_{12}$ and Q have the meaning defined in claim 1, ME, BG and r have the meaning defined in claim 11, q has the meaning defined in claim 12, $R_{16a}$ is a di- to tetravalent organic residue, and t is 0 or 1.

14. The redox-flow-battery according to claim 12, characterized in that $R_{15}$ is —O—$(C_sH_{2s})$—$R_{23}$, —S—$(C_sH_{2s})$—$R_{23}$ or —$NR_2$—$(C_sH_{2s})$—$R_{23}$, s is an integer from 2 to 4, $R_2$ has one of the meanings defined in clam 1, $R_{23}$ is a functional group selected from —OH, —SH, —NO$_3$, —NO$_2$, —CN, —OR$_{17}$, —SR$_{17}$, —(O—CH$_2$—CH$_2$)$_v$—OR$_{18}$, —(O—CH$_2$—CH$_2$)$_v$—SR$_{18}$, —COR$_{18}$, —COO$^-$(Kat$^{u+}$)$_{1/u}$, —COOR$_{18}$, —SO$_3^-$(Kat$^{u+}$)$_{1/u}$, —SO$_3$R$_{18}$, —SO$_4^-$(Kat$^{u+}$)$_{1/u}$, —SO$_4$R$_{18}$, —PO$_4^{2-}$(Kat$^{u+}$)$_{2/u}$, —PO$_4$(R$_{18}$)$_2$, —PO$_3^{2-}$(Kat$^{u+}$)$_{2/u}$, —PO$_3$(R$_{18}$)$_2$ or —NR$_{19}$R$_{20}$R$_{21}^+$(An$^{m-}$)$_{1/m}$, $R_{17}$ is $C_1$-$C_4$ alkyl, $R_{18}$ is hydrogen or $C_1$-$C_4$ alkyl, $R_{19}$, $R_{20}$ and $R_{21}$ independently of one another are hydrogen or alkyl,

Kat is an u-valent cation,

An is an m-valent anion, m and u independently of one another are integers between 1 and 4, and v is an integer from 1 to 50.

15. The redox-flow battery of claim 1, wherein the catholyte includes an organic compound comprises at least one redox-active residue of formula (Ia)

(Ia)

in combination with hydrochloric acid and/or a salt selected from the group consisting of ammonium salts with inorganic or organic anions, salts with tetrafluoroborate anions or salts of trifluoromethanesulfonic acid.

16. The redox-flow battery of claim 1, wherein the catholyte includes an organic compound comprising at least one redox-active residue of the formula (Ib)

(Ib)

17. The redox-flow battery of claim 1, wherein the catholyte includes an organic compound comprising at least one redox-active residue of the formula (Ic)

(Ic)

* * * * *